Aug. 18, 1942.    W. P. CLAUS ET AL    2,293,194
WHEEL HANDLING DEVICE
Filed June 16, 1939    4 Sheets-Sheet 2

INVENTORS
William P. Claus
George S. Hill
BY Donald U. Rich
ATTORNEY

Aug. 18, 1942.　　W. P. CLAUS ET AL　　2,293,194
WHEEL HANDLING DEVICE
Filed June 16, 1939　　4 Sheets-Sheet 4

INVENTORS
William P. Claus
George S. Hill
BY Donald A. Rich
ATTORNEY

Patented Aug. 18, 1942

2,293,194

UNITED STATES PATENT OFFICE 2,293,194

WHEEL HANDLING DEVICE

William P. Claus and George S. Hill, Berwick, Pa., assignors to American Car and Foundry Company, New York, N. Y., a corporation of New Jersey Application June 16, 1939, Serial No. 279,452

14 Claims. (Cl. 214—41)

This invention relates to wheel handling devices in general and in particular to such devices intended for use in foundries or at any point where it is necessary to handle heavy wheels.

It is now the practice in handling wheels, both from the soaking pits and in the assembly plant, to lower the wheel onto the floor, after which it is necessary for a workman to take a pole or bar and insert the same in the hub opening to pry the wheel into an upright position. With the wheel in the upright position a second man will roll the wheel to its desired location. This is extremely heavy and dangerous work for frequently a workman's hand will slip allowing the wheel to become overbalanced and fall, with the result that quite frequently feet and even legs are crushed so badly as to require amputation. The large wheels range in weight from 600 to 900 pounds each and as they come out of the soaking pits are at a temperature as high as 600 degrees and it is, therefore, extremely dangerous to handle these wheels. It is an object, therefore, of the present invention to provide a device operable by a single man and so arranged that he need never come near the wheel while moving the same to its desired position.

A further object of the invention is the provision of an automatically operable tilt table which will deliver the heavy, hot wheels to a carry-off carriage controlled by the operator.

A still further object of the invention is the provision of an automatically operating tilt table which will receive the wheel in a horizontal position and deliver it to a carry-off carriage in a substantially vertical position for stacking.

A yet further object of the invention is the provision of a wheel handling device in which the wheel is positively retained at all times by the component parts of the device during the handling of the wheel.

These and other objects of the invention will be apparent to persons skilled in the art from a study of the following description and accompanying drawings in which:

Fig. 6 is a side elevational view, partly in section, of the carry-off carriage with the wheel in position thereon.

Figure 1:
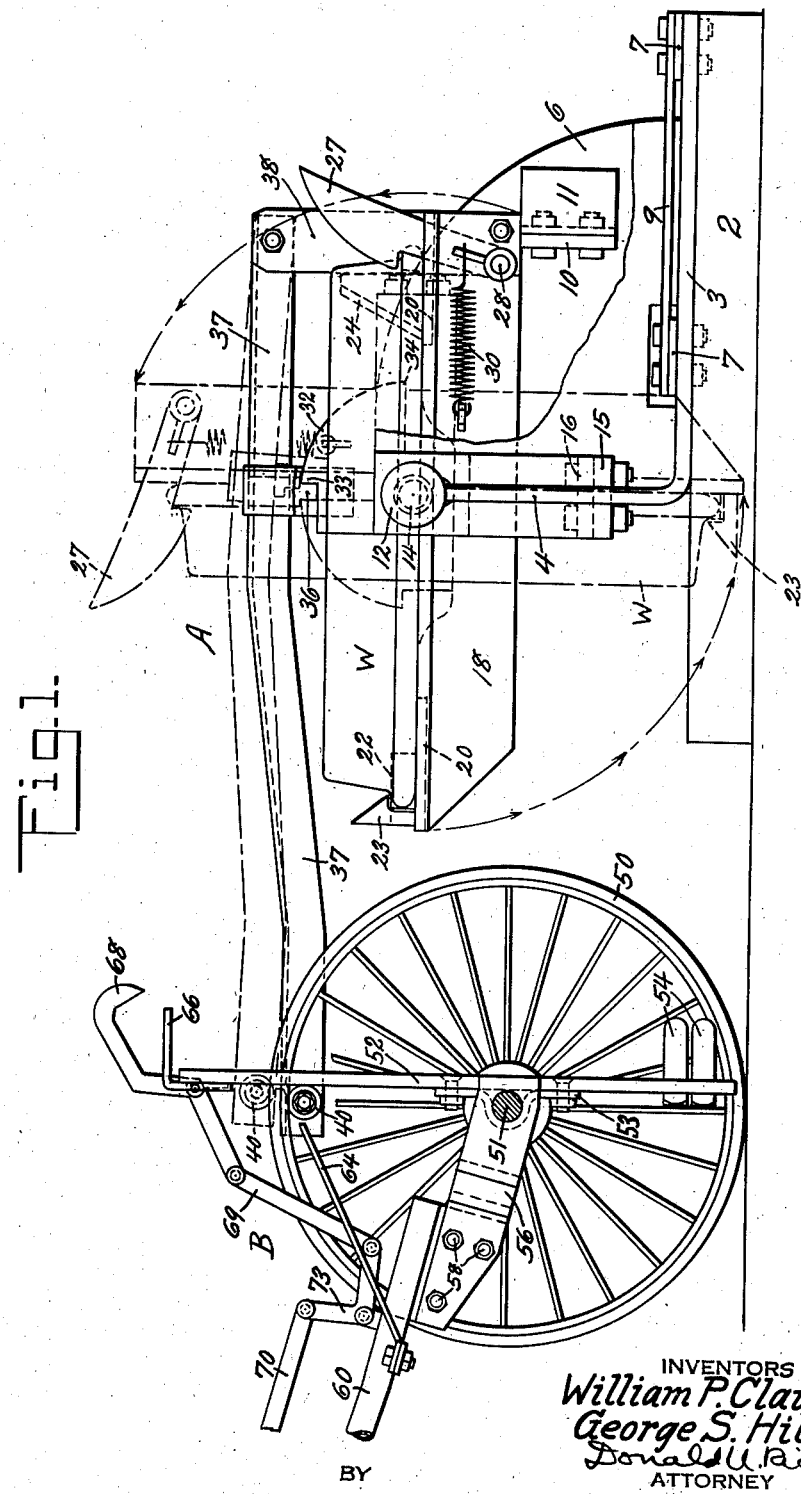
Figure 1 is a side elevational view disclosing the component parts of the wheel handling device also showing in line and dash the position of a part of the device when in position to deliver a wheel to the other part.
Figure 2:
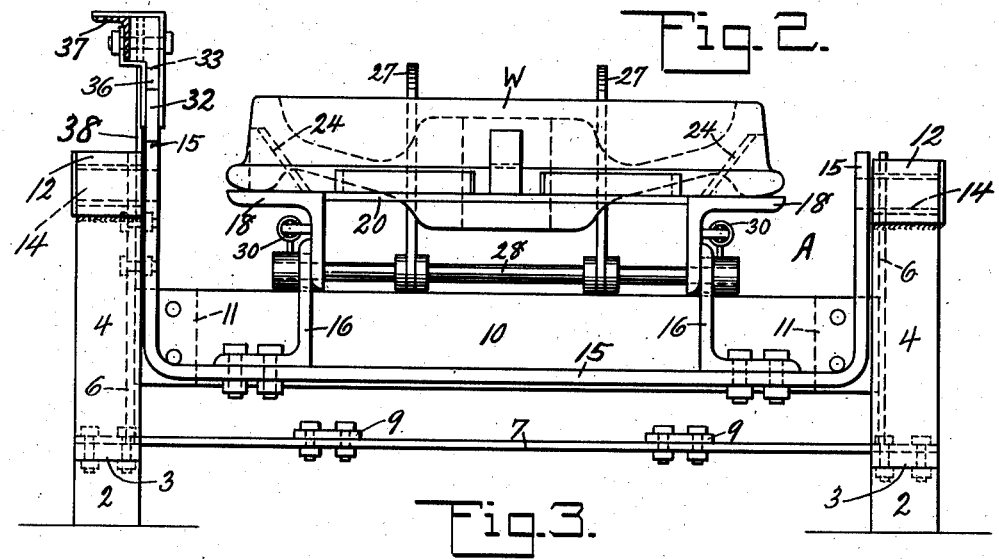
Fig. 2 is a front end view of the tilt table forming one of the parts of the device.
Figure 3:
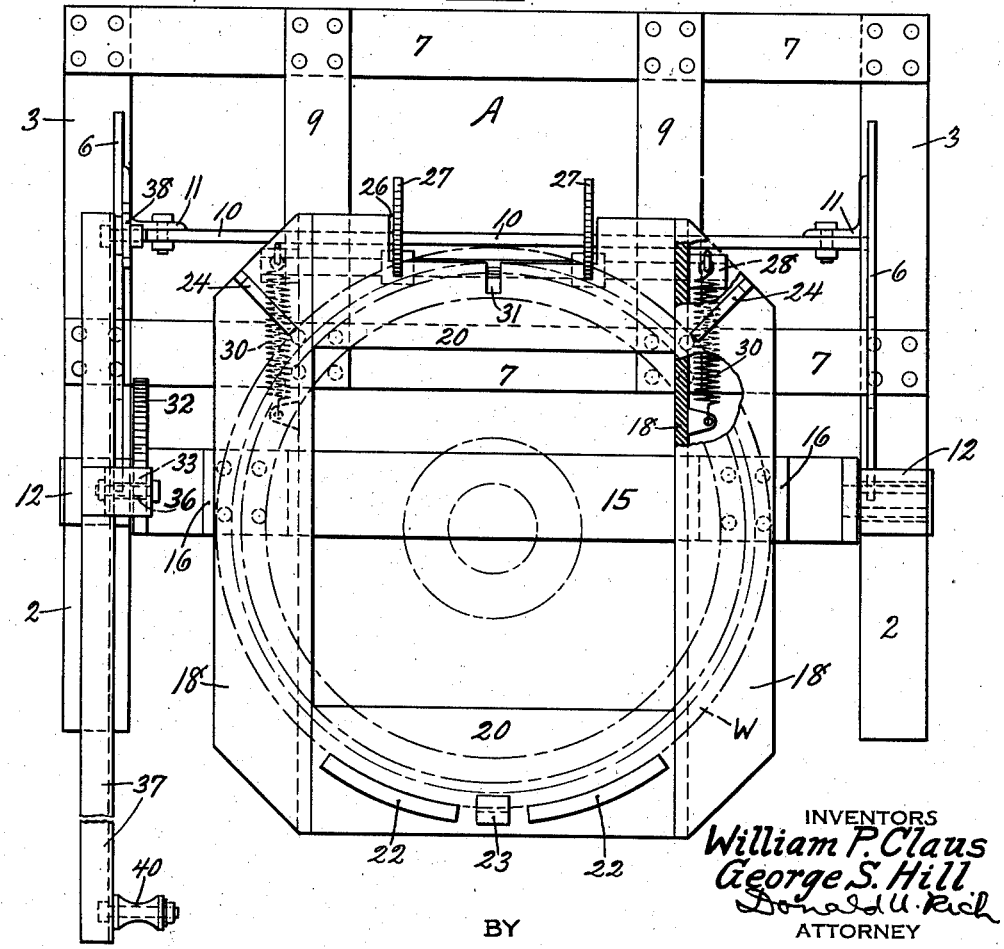
Fig. 3 is a plan view of the tilt table shown in Fig. 2.

Referring now to the drawings in detail it will be seen that the wheel handling device consists of two component parts, namely, a tilt table A and a carry-off carriage 3. The tilt table consists of base pieces 2 which may be secured to the floor and to which are secured the horizontal legs 3 of angle shaped members having their vertical legs 4 directed upwardly. The horizontal leg 3 and vertical leg 4 of each angle piece are connected together by bracing gussets 6 welded or otherwise secured to the legs, while the horizontal legs and base members are tied together in proper relation by transversely extending bars 7 which are in turn braced by ties 9, all as clearly shown in Figs. 1, 2 and 3. The bracing gussets are tied together by means of bar 10 secured to the gussets by any suitable means, such as angles 11, and this bar serves not only to tie the gussets together, but also to act as a stop for the rotatable table later to be described.

The upper ends of legs 4 have welded or otherwise secured thereto bearing structures 12 adapted to rotatably support stub shafts 14 which extend through the bearings and carry at their inner ends a U-shaped strap 15. This U-shaped strap has connected thereto a pair of short angle members 16, to one leg of which is secured the angles 18 forming the side pieces for the rotating or tilt table. The side angles 18 have the one leg extending vertically and the other legs directed outwardly away from each other and are connected together adjacent their ends by bars 20 located in the plane of the outwardly directed legs, thus forming with the angle a substantially rectangular table or platform rigidly connected to the U-shaped strap, which is in turn pivotally mounted upon the supporting structure. One of the connecting plates 20 has welded or otherwise secured thereto bottom stops 22 and a retaining hook shaped lug 23, while the outwardly directed legs of the side pieces have secured thereto at the ends remote from the bottom lugs 22 and 23 a pair of centering lugs or braces 24 adapted to guide the wheel W into position upon the table. The other connecting plate 20 has a part thereof removed as at 26 in order to permit movement of latches 27 keyed or otherwise secured upon shaft 28 journaled in the legs of the side pieces. The latches are constantly urged toward the center of the platform or table by means of springs 30 connected to an arm mounted on the shaft and to a lug secured to the side pieces of the table or platform. Intermediate the latches 27 an additional notch or cut-out portion 31 is made in the plate (Figs. 3 and 5) for a purpose later to be described. One of the arms of the U-shaped supporting strap has secured thereto, as by welding or otherwise, a plate 32 having the upper edge curved concentric with the pivot shafts and terminating at its ends in shoulders 33 and 34 adapted to engage a lug 36 secured upon a trip arm 37. One end of the trip arm is pivotally mounted upon the tilt table base by means of standards 38 secured to one of the bracing gussets, while the other end of the trip arm is extended outwardly a considerable distance from the base and table and has secured thereto a roller 40. It will be seen from the drawings that by use of the U-shaped strap it has been possible to place the platform or table slightly below the axis upon which the table is mounted for rotation, thus causing the axis of rotation to pass through the flange of the wheel which will be supported upon the tilt table. It should also be noted that the axis of the wheel is slightly to one side of the axis of the tilt table, thus causing the tilt table, when the wheel is mounted thereon, to rotate in a counter-clockwise direction as viewed in Figure 1. The axis of rotation for the table is necessarily slightly to one side of its center but the addition of the latches, connecting shaft and spring will more than offset this difference and cause a slight out-of-balance on the table itself due to the latches. Also, when the table is in a vertical position to deliver the wheel the U-shaped strap and angles 16 are at a considerable distance from the axis and will tend to cause the tilt table to rotate in a clockwise direction, as viewed in Figure 1, until the table has reached a horizontal position in which it is held by the side angles 18 striking the stop which connects the bracing gussets. In other words, the tilt table with wheel mounted thereon constantly tends to assume a vertical position and is held in such vertical position by the angles striking one of the cross members tying the base frame together as is clearly shown in Fig. 5; while when the wheel is removed from the tilt table it tends to return to a horizontal position with the angle striking the stop 10, that is, the center of gravity of the loaded tilt table is always to the left of the axis, while the center of gravity of the unloaded table is always to the right of the axis as viewed in Figure 1.

Figure 4:
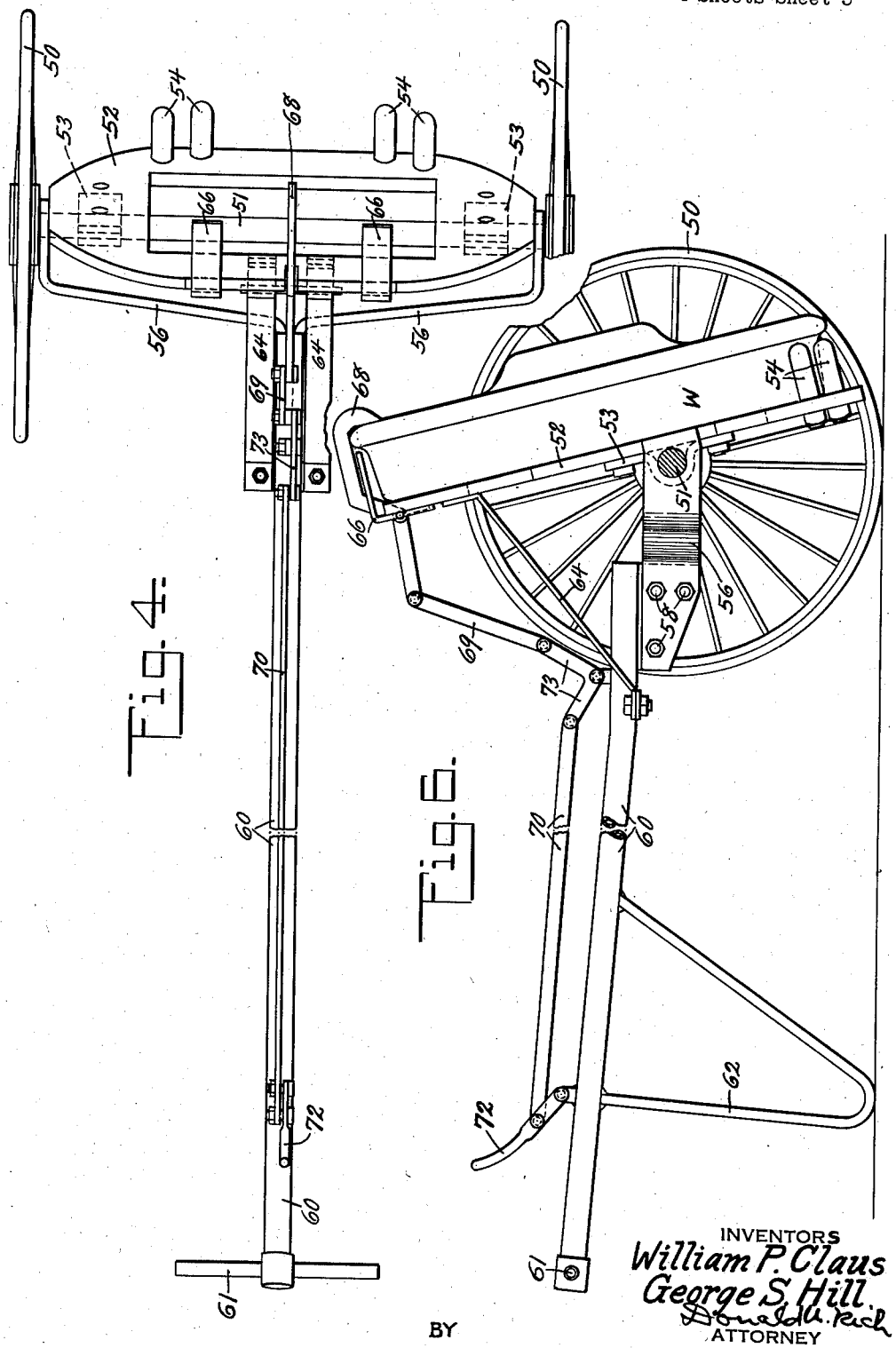
Fig. 4 is a plan view of the carry-off carriage which forms a second component part of the device.

The second component part of the handling device, as previously stated, consists of the carry-off carriage B and this carriage is formed by a pair of wheels 50 joined together by an axle 51. A wheel receiving table 52 is secured to the axle by means of U-shaped clips or other means 53 and as clearly shown in Figs. 4 to 6 this wheel receiving table has the central portion thereof cut out in order to lighten the same. The lower edge of the wheel receiving table has secured thereto outstanding lugs 54 adapted to engage the tread of the wheel and support the same and these lugs are spaced sufficiently from the center to prevent any rolling tendency of the wheel on the receiving table. In order to control the movements and angular position of the receiving table bars 56 are secured to the side edges of the table adjacent the axle and are themselves connected together by means of bolts or other securing devices 58 extending through a plate or similar structure to which one end of tubular handle 60 is secured. The opposite end of the handle is provided with hand grips 61, while intermediate its ends is secured a V-shaped supporting leg 62 adapted to support the handle. The handle is additionally connected to the receiving table by means of bracing ties 64, thus stiffening the table and preventing any distortion between the table and handle.

At substantially spaced points on the upper edge of the wheel receiving table are welded or otherwise secured projecting latch releasing members 66 so spaced as to engage the inclined faces of latches 27 carried by the tilt table and previously described. Intermediate the latch releasing members is a latch 68 pivotally connected to the wheel receiving table and formed with a hook portion adapted to engage over the flange of the wheel when positioned on the receiving table. This latch is controlled by bars 69 and 70 connected respectively at one end to the latch and to an operating handle 72, while the other end of each is connected together by means of a bell crank 73 pivotally mounted upon the inner end of the handle. The angular relation of the operating handle 72 is such that, together with the weight of bar 70, the latch 68 may be automatically held in either the latched or released position.

Figure 5:
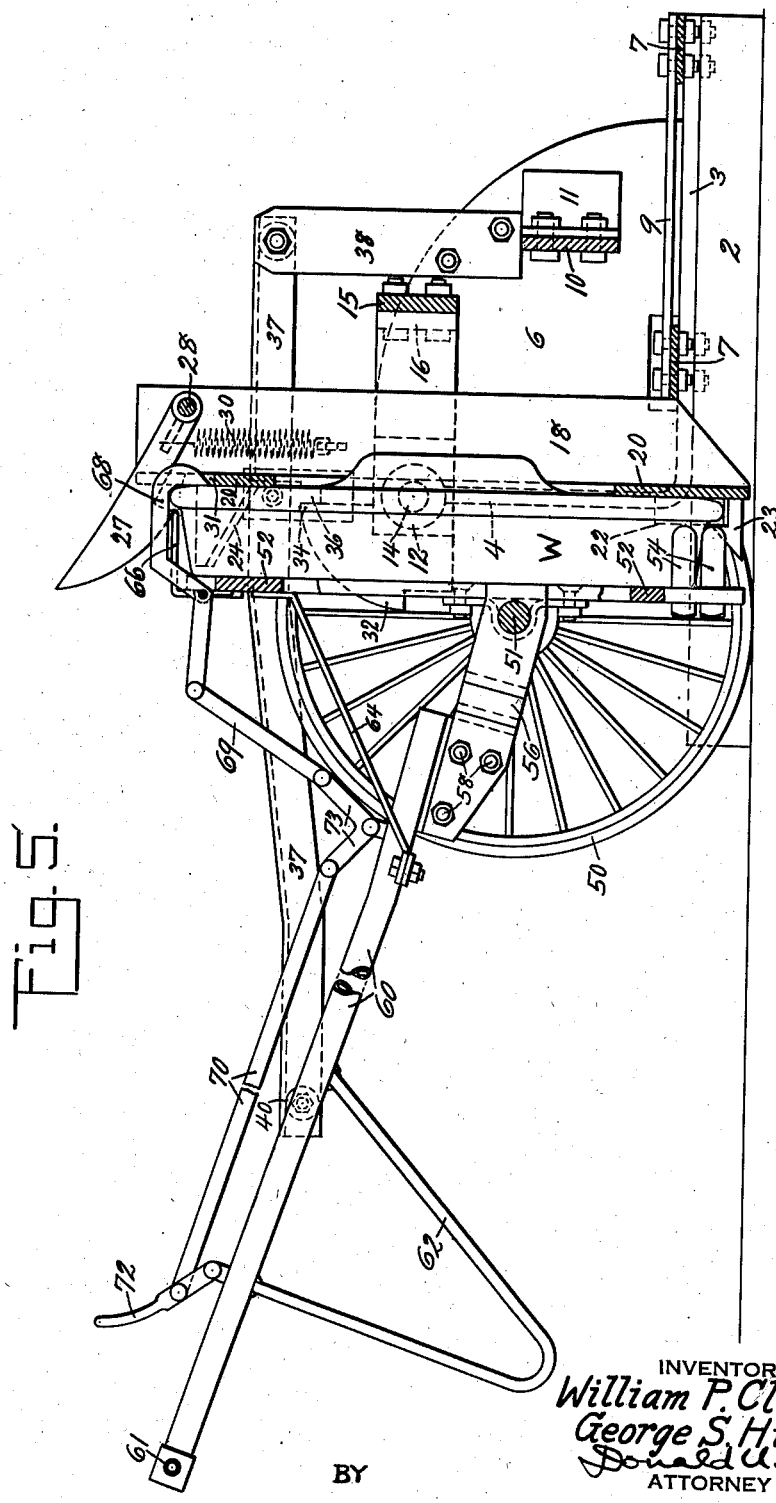
Fig. 5 is a side view partially in section and with the parts in position for transfer of the wheel from one component part to the other.

The operation of the device is as follows and assuming the tilt table to be in its horizontal position which it will automatically assume: A wheel with flange downward is lowered upon the tilt table with lug 23 and lugs 24 operating to center the wheel on the tilt table and force the same under the hook portion of lug 23; also during lowering the latches 27 will retract and as soon as the wheel has come to rest upon the tilt table they spring forward to engage over the flange of the wheel. The wheel is now held in position upon the tilt table which is prevented from rotating by reason of the lug 36 of the operating handle being in engagement with shoulder 33. An operator now pushes the carry-off carriage toward the tilt table with one of the carriage wheels 50 engaging the roller 40 causing the latch bar to be moved upwardly disengaging the lug from shoulder 33 and permitting the wheel and tilt table to promptly assume a vertical position as clearly shown in Fig. 5. Continued movement of the carriage inwardly will cause releasing members 66 to lift latches 27 and permit the upper edge of the wheel to tilt against the receiving table of the carriage. Before this can occur, however, the lugs 54 have engaged beneath the tread of the wheel and are in position to receive the weight thereof. The operator now throws handle 72 causing latch 68 to engage over the flange of the wheel, with such engagement permitted due to the slot 31 in the tilt table. As soon as the latch 68 is engaged the operator by bearing down slightly on the handle lifts the wheel free of lug 23 and the carriage with wheel securely mounted thereon may now be withdrawn. During engagement of the carriage with the wheel as shown in Fig. 5 the latch bar has returned to its normal position with lug 36 being engaged with shoulder 34, therefore, as the carriage is withdrawn from the tilt table it is impossible for the tilt table to rotate and interfere with the wheel, but as soon as the carriage wheels again engage roller 40 they will lift the latch bar disengaging lug 36 and shoulder 34, with the result that the tilt table promptly assumes a horizontal position and is ready to receive another wheel. The carriage may now be moved to any desired location and the wheel is released therefrom by the operator merely raising the handle until the wheel flange engages the floor, after which the latch 68 is released leaving the wheel standing in a slightly tilted position against any convenient structure. It is, of course, obvious that as soon as the tilt table has returned to its horizontal position, the latch bar will again cause lug 36 to engage shoulder 33 and prevent any tilting of the table until released by the carriage wheel.

It will be seen from the preceding description of the component parts of the device and their operation that it is never necessary for a workman to approach the heavy car wheel or to ever be in any position wherein a part of the device could injure him; therefore, there is no danger in the handling of the heavy car wheels which, as previously stated, may range in weight from 600 to 900 pounds and be handled at temperatures of 600 or more degrees Fahrenheit. It will, of course, be obvious to persons skilled in the art that various modifications and rearrangements of parts may be made but all such modifications and rearrangements of parts are contemplated as will come within the scope of the following claims which define our invention.

What is claimed is:

1. In a wheel handling device the combination of a tilt table adapted to receive successive wheels in a substantially horizontal position and to hold them in a substantially vertical position for discharge, wheel receiving means for receiving the successive wheels from said tilt table, and means carried by said wheel receiving means to release the wheels from said tilt table and secure the same on said wheel receiving means.

2. In a wheel handling device the combination of a tilt table adapted to receive successive wheels in a substantially horizontal position, means to permit rotation of said tilt table and wheel to a substantial vertical position for discharge of the wheel, and a wheel removing carriage carrying thereupon devices for receiving the successive wheels from said tilt table when in the substantially vertical position, a portion of said means being operated by said carriage to permit rotation of the tilt table and wheel to the substantially vertical wheel discharging position during movement of the carriage toward the tilt table, and said portion being also operated by said carriage during reverse movement thereof to permit said tilt table to return to the substantially horizontal wheel receiving position.

3. In a wheel handling device the combination of a tilt table adapted to be locked in a substantially horizontal position to receive successive wheels and in a substantially vertical position to discharge the wheels, a wheel receiving carriage adapted to be moved toward the tilt table, said carriage having devices thereon to engage and remove the successive wheels from the tilt table when in the substantially vertical wheel discharging position, and means operated by said carriage during its movement toward the tilt table to release the tilt table for movement to substantially vertical wheel discharging position.

4. In a wheel handling device the combination of a tilt table adapetd to be locked in a substantially horizontal position to receive successive wheels and in a substantially vertical position to discharge the wheels, a wheel receiving carriage adapted to be moved toward the tilt table, said carriage having devices thereon to engage and remove the successive wheels from the tilt table when in the substantially vertical wheel discharging position, and means operated by said carriage during its movement toward the tilt table to release the tilt table for movement to substantially vertical wheel discharging position, said means operating to release the tilt table for movement to wheel receiving position during reverse movement of the carriage.

5. In a wheel handling device the combination of a tilt table adapted to receive successive wheels in a substantially horizontal position and to discharge them in a substantially vertical position, lock means retaining said wheels upon the tilt table, a wheel receiving carriage for receiving the successive wheels from said tilt table, and means on said wheel receiving carriage for releasing said lock means to permit discharge of the wheel from the tilt table.

6. In a wheel handling device the combination of a tilt table adapted to receive successive wheels in a substantially horizontal position and to discharge them in a substantially vertical position, lock means retaining said wheels upon the tilt table, a wheel receiving carriage for receiving the successive wheels from said tilt table, means on said wheel receiving carriage for releasing said lock means to permit discharge of the wheel from the tilt table, and additional means on said wheel receiving carriage to lock the wheels thereon prior to discharge from the tilt table.

7. In a wheel handling device the combination of a base frame, a tilt table rotatably mounted on said base and adapted to receive successive wheels in a substantially horizontal position and to discharge them in a substantially vertical position, lock means for retaining said tilt table in wheel receiving and wheel discharging positions, and a wheel receiving carriage movable toward and away from said tilt table, said carriage operating said lock means during movement of the carriage toward and away from the tilt table.

8. In a wheel handling device the combination of a base frame, a tilt table rotatably mounted on said base and adapted to receive successive wheels in a substantially horizontal position and to discharge them in a substantially vertical position, lock means for retaining said tilt table in wheel receiving and wheel discharging positions, a wheel receiving carriage movable toward and away from said tilt table, said carriage operating said lock means during movement of the carriage toward and away from the tilt table, and wheel locking means carried by said carriage and engageable with the wheel to retain the same upon the carriage after discharge of the wheel from the tilt table.

9. In a wheel handling device the combination base, a tilt table mounted on said base for rotation about a substantially horizontal axis from a substantially horizontal wheel receiving position to a substantially vertical wheel discharging position, lugs on said table adapted to center said wheel thereon as it is received and certain of said lugs supporting said wheel on the table when in wheel discharging position, latch means carried by the table and engageable with the wheel to prevent accidental discharge thereof from the table, a wheel receiving carriage for removing the wheel from said tilt table when in wheel discharging position, spaced lugs carried by said carriage and adapted to lift the wheel from said lugs on the tilt table, and means on said wheel receiving carriage for releasing said latch means to permit removal of the wheel from the tilt table.

10. In a wheel handling device the combination of a base, a tilt table mounted on said base for rotation about a substantially horizontal axis from a substantially horizontal wheel receiving position to a substantially vertical wheel discharging position, lugs on said table adapted to center said wheel thereon as it is received and certain of said lugs supporting said wheel on the table when in wheel discharging position, latch means carried by the table and engageable with the wheel to prevent accidental discharge thereof from the table, additional latch means for retaining said tilt table in wheel receiving and wheel discharging positions, a wheel receiving carriage for removing the wheel from said tilt table when in wheel discharging position, means on said wheel receiving carriage for releasing said latch means to permit removal of the wheel from the tilt table, said carriage operating said additional latch means during movement of the carriage toward and away from the tilt table.

11. In a wheel handling device the combination of a base, a tilt table mounted on said base for rotation about a substantially horizontal axis from a substantially horizontal wheel receiving position to a substantially vertical wheel discharging position, lugs on said table adapted to center said wheel thereon as it is received and certain of said lugs supporting said wheel on the table when in wheel discharging position, latch means carried by the table and engageable with the wheel to prevent accidental discharge thereof from the table, a wheel receiving carriage for removing the wheel from the tilt table when in wheel discharging position and including carriage wheels supporting an axle, a carriage table mounted on said axle, spaced lugs secured to said carriage table and adapted to support and center the car wheel on said carriage table when removed from said tilt table, and an operating handle secured to said carriage table to control the angular position thereof and permit lifting of said wheel from said lugs on the tilt table by said spaced carriage table lugs.

12. In a wheel handling device the combination of a base, a tilt table mounted on said base for rotation about a substantially horizontal axis from a substantially horizontal wheel receiving position to a substantially vertical wheel discharging position, lugs on said table adapted to center said wheel thereon as it is received and certain of said lugs supporting said wheel on the table when in wheel discharging position, latch means carried by the table and engageable with the wheel to prevent accidental discharge thereof from the table, a wheel receiving carriage for removing the wheel from said tilt table when in wheel discharging position and comprising, carriage wheels supporting an axle, a carriage table mounted on said axle, spaced lugs secured to said carriage table and adapted to support and center the car wheel thereon, an operating handle secured to said carriage table to control the angular position thereof and permit lifting of said wheel from said tilt table, and a latch carried by said carriage table adjacent the upper portion thereof and engageable with the wheel to prevent accidental removal of the wheel from the carriage table.

13. In a wheel handling device the combination of a base, a tilt table mounted on said base for rotation about a substantially horizontal axis from a substantially horizontal wheel receiving position to a substantially vertical wheel discharging position, lugs on said table adapted to center said wheel thereon as it is received and certain of said lugs supporting said wheel on the table when in wheel discharging position, latch means carried by the table and engageable with the wheel to prevent accidental discharge thereof from the table, additional latch means for retaining said tilt table in wheel receiving and wheel discharging positions, a wheel receiving carriage movable toward and away from said tilt table, and comprising carriage wheels supporting an axle, a carriage table mounted on said axle and rotatable therewith, spaced lugs secured to said carriage table adjacent the lower edge thereof and adapted to support and center the car wheels thereon, latch means rotatably secured to the upper edge portion of said carriage table and engageable with the car wheels to prevent accidental removal thereof from said carriage table, and an operating handle secured to said carriage table for controlling the angular position thereof whereby the car wheels may be lifted from said tilt table by said spaced lugs, said last named latch means being operable from the operating handle to permit removal of the car wheel from said carriage table.

14. In a car wheel handling device the combination of a base, a tilt table mounted on said base for rotation about a substantially horizontal axis from a substantially horizontal wheel receiving position to a substantially vertical wheel discharging position, lugs on said tilt table adapted to center said car wheel thereon as it is received with certain of said lugs supporting said car wheel on the tilt table when in wheel discharging position, a car wheel receiving carriage movable toward and away from said tilt table for removing said car wheel from the tilt table, said carriage comprising carriage wheels supporting an axle, a carriage table mounted on said axle, spaced lugs secured to said carriage table and adapted to support and center the car wheel thereon, an operating handle secured to said carriage table to control the angular position thereof, and cause said spaced lugs to lift the car wheel from the lugs on the tilt table.

WILLIAM P. CLAUS.
GEORGE S. HILL.